United States Patent
Ha

(10) Patent No.: US 12,463,469 B2
(45) Date of Patent: Nov. 4, 2025

(54) TRANSMISSION UNIT OF WIRELESS OPTICAL CHARGING SYSTEM CONSIDERING USER SAFETY

(71) Applicant: INDUSTRY-ACADEMIA COOPERATION GROUP OF SEJONG UNIVERSITY, Seoul (KR)

(72) Inventor: Jin Yong Ha, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 18/397,487

(22) Filed: Dec. 27, 2023

(65) Prior Publication Data

US 2025/0219456 A1 Jul. 3, 2025

(30) Foreign Application Priority Data

Dec. 27, 2023 (KR) .................. 10-2023-0192518

(51) Int. Cl.
- *H02J 50/30* (2016.01)
- *H02J 50/60* (2016.01)
- *H04B 10/80* (2013.01)

(52) U.S. Cl.
CPC .............. *H02J 50/30* (2016.02); *H02J 50/60* (2016.02); *H04B 10/807* (2013.01)

(58) Field of Classification Search
CPC .......... H02J 50/30; H02J 50/60; H04B 10/807
See application file for complete search history.

(56) References Cited

U.S. PATENT DOCUMENTS

| | | | |
|---|---|---|---|
| 2006/0266917 A1* | 11/2006 | Baldis | H01Q 3/46 250/200 |
| 2010/0012819 A1* | 1/2010 | Graham | H02J 50/30 250/237 R |
| 2012/0007445 A1* | 1/2012 | Hyde | H02J 50/90 307/149 |
| 2015/0219975 A1* | 8/2015 | Phillips | E06B 9/24 359/275 |
| 2016/0052407 A1* | 2/2016 | Shimizu | H02J 50/005 320/108 |
| 2018/0123403 A1* | 5/2018 | Kare | H04B 10/807 |
| 2018/0131449 A1* | 5/2018 | Kare | G01S 7/484 |
| 2018/0136364 A1* | 5/2018 | Kare | G01S 17/89 |
| 2019/0064353 A1* | 2/2019 | Nugent, Jr. | G01S 17/04 |
| 2019/0207431 A1* | 7/2019 | Youn | H02J 50/60 |
| 2019/0334389 A1* | 10/2019 | Kim | H02J 50/30 |
| 2021/0234409 A1* | 7/2021 | Ha | G02B 5/12 |
| 2023/0083467 A1* | 3/2023 | Winzer | H04B 10/807 398/34 |

* cited by examiner

*Primary Examiner* — Rexford N Barnie
*Assistant Examiner* — David A Shiao
(74) *Attorney, Agent, or Firm* — Bridgeway IP Law Group, PLLC; Jihun Kim

(57) ABSTRACT

A transmission unit of a wireless optical charging system considering user safety according to the present disclosure includes: a light source unit that generates laser light; an output unit that outputs the laser light to an outside; a reflected light output unit that is located between the light source unit and the output unit and outputs reflected light in which the output laser light is reflected from a reception unit and returned; and a light generation control unit that controls a generation of the laser light from the light source unit according to a result of determining whether a user is located between the transmission unit and the reception unit based on the reflected light.

9 Claims, 2 Drawing Sheets

TRANSMISSION UNIT OF WIRELESS OPTICAL CHARGING SYSTEM CONSIDERING USER SAFETY

CROSS-REFERENCE TO RELATED APPLICATIONS

The present application claims priority and benefit to Korean patent application No. 10-2023-0192518 filed on Dec. 27, 2023, the entire contents of which is incorporated by reference herein.

BACKGROUND

Technical Field

The present disclosure relates to a transmission unit of a wireless optical charging system considering user safety.

Description of the Related Art

Currently known wireless charging technologies include a magnetic induction method, a magnetic resonance method, an RF electromagnetic wave method, a light using method, and the like.

However, the magnetic induction and magnetic resonance methods have relatively high efficiency but have a limitation in that a transmittable distance of power is short. In addition, the RF electromagnetic wave method may dramatically increase the transmittable distance of power, but has low efficiency, so it is evaluated that the RF electromagnetic wave method will take a long time to be commercialized.

Therefore, there is increasing interest in a wireless optical charging system capable of increasing the transmittable distance of power compared to the magnetic induction and magnetic resonance methods and increasing the efficiency of power transmission compared to the RF electromagnetic wave method.

However, since the wireless optical charging system uses a laser which is amplified light energy, when the laser directly touches a human body, the laser may have a harmful effect on the human body.

Therefore, in the wireless optical charging system, there is an emerging need for a method capable of ensuring safety of a user or people around the wireless optical charging system by detecting when a person is located in a path through which laser light passes and controlling an output of the laser light.

SUMMARY OF INVENTION

Technical Problem

An object to be achieved by the present disclosure is to provide a transmission unit of a wireless optical charging system capable of ensuring safety by detecting when a person is located in a path through which laser light passes and reducing or stopping an output of the laser light.

Technical Solution

According to an aspect of the present disclosure, there is provided a transmission unit of a wireless optical charging system considering user safety, including: a light source unit that generates laser light; an output unit that outputs the laser light to an outside; a reflected light output unit that is located between the light source unit and the output unit and outputs reflected light in which the output laser light is reflected from a reception unit and returned; and a light generation control unit that controls a generation of the laser light from the light source unit according to a result of determining whether a user is located between the transmission unit and the reception unit based on the output reflected light.

Desirably, the light source unit may include: a single mode fiber that has one light propagation mode; an optical fiber laser that is formed on a path of the single mode fiber and outputs the laser light in a wide band by adjusting its output; a laser pump that is linked to the light generation control unit to add the laser light to the single mode fiber; an optical wavelength combiner that combines the laser light added from the laser pump with the laser light from the single mode fiber; and a circulator that is located on the single mode fiber path and outputs the generated laser light to the output unit.

Desirably, the reflected light output unit may output the reflected light, which is reflected from the reception unit and returned, using a beam splitter.

Desirably, the light generation control unit may include: a photo detector that generates a current corresponding to the reflected light; and a laser controller that controls the generation of the laser light from the light source unit according to a magnitude of the generated current.

Desirably, the laser controller may generate a generation signal which is a signal requesting the light source unit to generate the laser light when the magnitude of the generated current is equal to or greater than a predetermined threshold value, and generate a stop signal which is a signal requesting the light source unit to stop generating the laser light when the magnitude of the generated current is less than the threshold value.

Desirably, the light generation control unit may further include: a current comparison unit that compares whether the magnitude of the generated current is equal to or greater than the threshold value; and a light source control unit that transmits the generation signal to the light source unit when the laser controller generates the generation signal while the magnitude of the generated current is equal to or greater than the threshold value, and transmits the stop signal in other cases.

Desirably, the light source unit may include: a laser generator that outputs the laser light in a wide band; and an optical isolator that outputs the output laser light in one direction, in which the laser generator may operate by being linked to the light generation control unit.

Desirably, the output unit may include: a diffraction grating that outputs the generated light onto a space; and a beam scanner that irradiates the light output onto the space to a predetermined location.

Advantageous Effects

According to the transmission unit of a wireless optical charging system according to the present disclosure, it is possible to ensure the user safety by detecting when a person is located in the path through which the laser light passes and reducing or stopping the output of the laser light.

DETAILED DESCRIPTION OF THE EMBODIMENT

Figure 1:
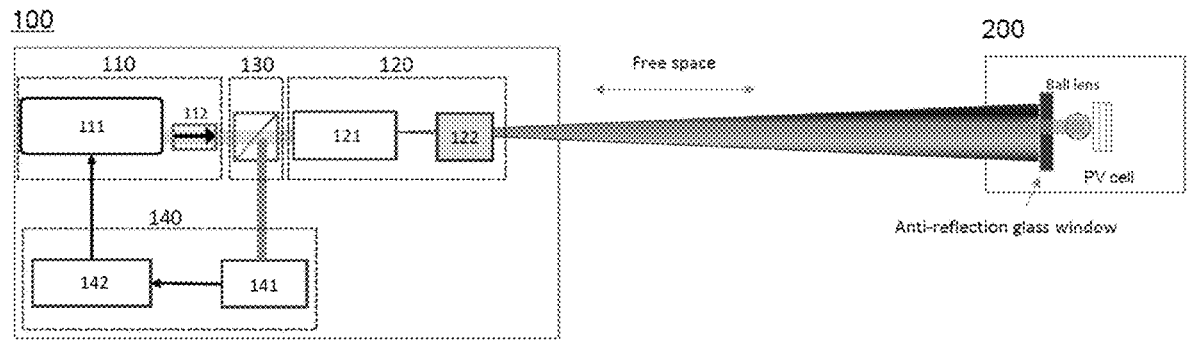
FIG. 1 is a diagram illustrating a transmission unit of a wireless optical charging system considering user safety according to an exemplary embodiment of the present disclosure.

The present disclosure may be variously modified and have several exemplary embodiments. Therefore, specific exemplary embodiments of the present disclosure will be described in detail with reference to the accompanying drawings. However, it is to be understood that the present disclosure is not limited to a specific exemplary embodiment, but includes all modifications, equivalents, and substitutions included in the spirit and technical scope of the present disclosure. In describing each drawing, similar reference numerals are used for similar components.

Terms used in the specification, "first," "second," "A," "B", etc., may be used to describe various components, but the components are not to be interpreted to be limited to the terms. The terms are used only to distinguish one component from another component. For example, a first component may be named a second component, and the second component may also be similarly named the first component, without departing from the scope of the present disclosure. A term 'and/or' includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween.

Terms used in the present application are used only in order to describe specific exemplary embodiments rather than limiting the present disclosure. Singular forms are intended to include plural forms unless the context clearly indicates otherwise. It will be further understood that the terms "comprises" or "have" used in this application, specify the presence of stated features, numerals, steps, operations, components, parts mentioned in this specification, or a combination thereof, but do not preclude the presence or addition of one or more other features, numerals, steps, operations, components, parts, or a combination thereof.

Unless indicated otherwise, it is to be understood that all the terms used in the specification including technical and scientific terms have the same meaning as those that are generally understood by those who skilled in the art. Terms generally used and defined by a dictionary should be interpreted as having the same meanings as meanings within a context of the related art and should not be interpreted as having ideal or excessively formal meanings unless being clearly defined otherwise in the present application.

Through the present specification and claims, unless explicitly described otherwise, "comprising" any components will be understood to imply the inclusion of other components rather than the exclusion of any other components.

Hereinafter, the present disclosure will be described in detail with reference to the accompanying drawings.

FIG. 1 is a diagram illustrating a transmission unit of a wireless optical charging system considering user safety according to an exemplary embodiment of the present disclosure.

A transmission unit 100 of a wireless optical charging system considering user safety according to an exemplary embodiment of the present disclosure includes a light source unit 110, an output unit 120, a reflected light output unit 130, and a light generation control unit 140.

The light source unit 110 generates laser light.

Here, the laser is an abbreviation for light amplification by stimulated emission of radiation, and a monochromatic laser beam or laser light that is strong, does not spread, and is transmitted far is called a 'laser'. In addition, the laser light has characteristics of monochromaticity, linearity, coherence, high output, and polarization.

For example, the light source unit 110 may generate the laser light using a semiconductor laser or optical fiber laser method that uses a semiconductor or optical fiber as a gain medium.

The output unit 120 outputs the generated laser light to the outside.

For example, the output unit 120 may include a diffraction grating 121 and output the generated laser light onto a space. In addition, the output unit 120 includes a beam scanner 122 and may be adjusted to irradiate the light output onto the space to a predetermined location.

The reflected light output unit 130 is located between the light source unit 110 and the output unit 120, and outputs reflected light in which the output laser light is reflected from the reception unit 200 and returned.

Figure 2:
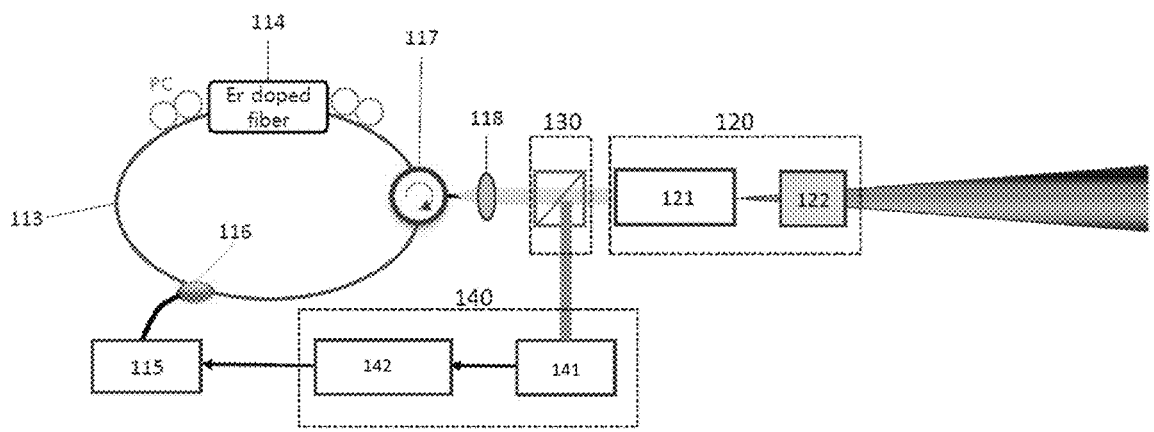
FIG. 2 is a diagram illustrating a light source unit according to another exemplary embodiment of the present disclosure.

In this case, referring to FIG. 2, the reception unit 200 may include a ball lens or a retro-reflector to reflect the received laser light. In this way, the reception unit 200 may reflect part of the laser light received from the transmission unit 100 toward the transmission unit 100.

In this case, the reflected light output unit 130 may output the reflected light that is reflected from the reception unit 200 and returned.

In another exemplary embodiment, the reflected light output unit 130 outputs the reflected light, which is reflected from the reception unit 200 and returned, using a beam splitter.

In this case, the beam splitter may be an optical device that reflects a part of the input laser light and transmits the rest of the laser light. That is, the beam splitter may output part of the laser light, which is reflected from the reception unit 200 and returned, as the reflected light and transmit the rest of the laser light.

Finally, the light generation control unit 140 controls a laser light generation of the light source unit 110 according to a result of determining whether a user is located between the transmission unit 100 and the reception unit 200 based on the output reflected light.

For example, when the light generation control unit 140 determines that the user is located between the transmission unit 100 and the reception unit 200, the light generation control unit 140 may control an output of the laser light to be safe for a human body by stopping the output of the laser light from the light source unit 110 or lowering the output of the laser light.

Meanwhile, users may be users directly using the wireless optical charging system or people (i.e., potential users) located around the transmission unit 100 of the wireless optical charging system.

In another exemplary embodiment, the light generation control unit 140 may include a photo detector 141 and a laser controller 142.

The photo detector 141 generates a current corresponding to the reflected light.

In this case, the photo detector 141 is for detecting light and may be a semiconductor device that converts photons into a current.

The laser controller 142 controls the generation of the laser light from the light source unit 110 according to a magnitude of the generated current.

That is, the laser controller 142 may control the generation of the laser light from the light source unit 110 by stopping or starting the generation of the laser light from the light source unit 110, adjusting the intensity of the output of the laser light, or the like.

In another exemplary embodiment, the laser controller 142 may generate a generation signal which is a signal requesting the light source unit 110 to generate the laser light when the magnitude of the generated current is greater than or equal to a predetermined threshold value, and generate a stop signal which is a signal requesting the light source unit 110 to stop generating the laser light when the magnitude of the generated current is less than the threshold value.

That is, when the magnitude of the generated current is equal to or greater than the threshold value, the laser controller 142 may determine that the user is not located between the transmission unit 100 and the reception unit 200 to generate the generation signal which is the signal requesting the generation of the laser light.

In addition, when the magnitude of the generated current is less than the threshold value, since the user is located between the transmission unit 100 and the reception unit 200, the laser controller 142 may determine that the reflected light does not return to generate the stop signal which is the signal requesting the generation of the laser light to be stopped.

In another exemplary embodiment, the generation signal may be used as a signal requesting the output of the laser light to be increased to a predetermined size that enables wireless optical charging, and the stop signal may be used as a signal requesting the output of the laser light to be lowered to a predetermined size that is harmless to the human body.

In another exemplary embodiment, the light source unit 110 may include a laser generator 111 that outputs the laser light in a wide band and an optical isolator 112 that outputs the output laser light in one direction.

In this case, the laser generator 111 may operate by being linked to the light generation control unit 140.

In other words, the laser generator 111 may operate by stopping or starting the generation of the laser light, adjusting the intensity of the output of the laser light, or the like under the control of the light generation control unit 140.

FIG. 2 is a diagram illustrating the light source unit 110 according to another exemplary embodiment of the present disclosure.

A single mode fiber 113 is an optical fiber that has one light propagation mode.

In this case, the single mode fiber is an optical fiber in which the propagation of light passing inside the optical fiber may be limited to one optical wavelength to ensure less loss and higher bandwidth.

The optical fiber laser 114 is formed on the path of the single mode fiber 113, and outputs the laser light whose output can be adjusted in a wide band.

In this case, the optical fiber laser 114 is an optical fiber amplifier in which low-level rare earth halide is added to the gain medium and may output light in a wide band by adjusting the light output over a wide range. For example, the optical fiber laser may be composed of an erbium or ytterbium doped fiber.

The laser pump 115 is linked to the light generation control unit 140 to add the laser light to the single mode fiber 113.

That is, the laser pump 115 may generate the laser light and add the generated laser light to the single mode fiber 113 or may not generate the laser light, under the control of the light generation control unit 140.

The optical wavelength combiner 116 combines the laser light added from the laser pump 115 with the laser light from the single mode fiber 113.

Here, the optical wavelength combiner 116 may combine the wavelength of the laser light added from the laser pump 115 with the wavelength of the laser light from the single mode fiber 113. To this end, a wavelength division multiplexing (WDM) combiner may be used.

A circulator 117 is located on the path of the single mode fiber 113 and outputs the generated laser light to the output unit 120.

That is, the circulator 117 may output the laser light of the single mode fiber 113 to the output unit 120, and then, input the laser light returned from the reception unit 200 back to the single mode fiber 113.

Figure 3:
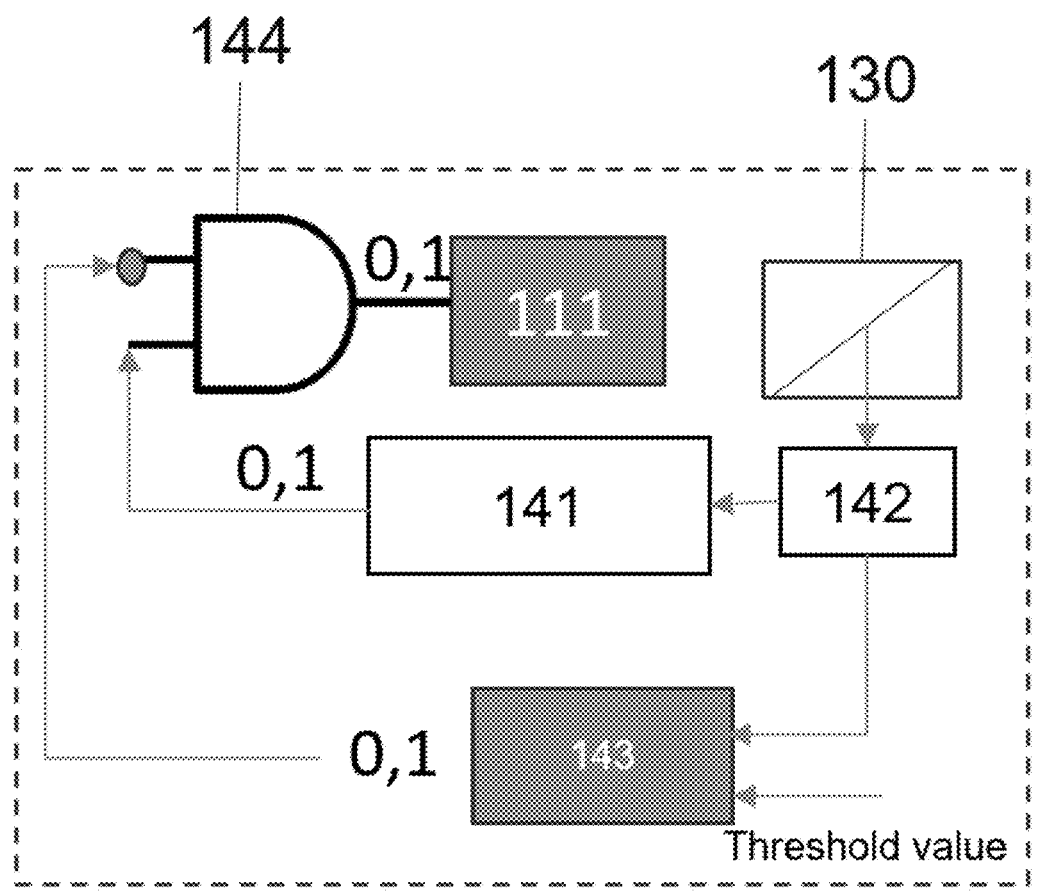
FIG. 3 is a diagram showing a light generation control unit according to another exemplary embodiment of the present disclosure.

FIG. 3 is a diagram illustrating the light generation control unit 140 according to another exemplary embodiment of the present disclosure.

The light generation control unit 140 according to another exemplary embodiment of the present disclosure includes a photo detector 141, a laser controller 142, a comparison unit 143, and a light source control unit 144.

The photo detector 141 generates the current corresponding to the reflected light.

The laser controller 142 controls the generation of the laser light from the light source unit 110 according to the magnitude of the generated current.

The current comparison unit 143 compares whether the magnitude of the generated current is equal to or greater than the threshold value.

For example, the current comparison unit 143 may compare the generated current with the threshold value, and output 1 when the magnitude of the generated current is equal to or greater than the threshold value, or otherwise, output 0.

Lastly, the light source control unit 144 transmits the generation signal to the light source unit 110 when the laser controller 142 generates the generation signal while the magnitude of the generated current is equal to or greater than the threshold value and transmits the stop signal to the light source unit 110 in other cases.

For example, when the laser controller 142 generates generation signal 1 while the magnitude of the generated current is equal to or greater than threshold value 1, the light source control unit 144 may transmit the generation signal 1 to the light source unit 110.

In addition, the light source control unit 144 may transmit a stop signal 0 to the light source unit 110 in other cases.

As the other cases, there are 1) a first case in which the laser controller 142 generates the stop signal 0 while the magnitude of the generated current is equal to or greater than the threshold value 1, 2) a second case in which the laser controller 142 generates the generation signal 1 while the magnitude of the generated current is less than threshold value 0, and 3) a third case in which the laser controller 142 generates the stop signal 0 while the magnitude of the generated current is less than the threshold value 0.

That is, the light source control unit 144 may operate in the same manner as an AND gate to transmit the generation signal 1 to the light source unit 110 only when the laser controller 142 generates the generation signal 1 while the magnitude of the generated current is equal to or greater than the threshold value 1.

In this way, the light source control unit 144 transmits the generation signal to the light source unit 110 only when the laser controller 142 generates the generation signal while the magnitude of the generated current is equal to or greater than the threshold value, thereby preventing the light source unit 110 from outputting high-output laser light in the situation where the user is located between the transmission unit 100 and the reception unit 200 due to the malfunction of the laser controller 142 or the current comparison unit 143.

The technical spirit of the present disclosure has been illustratively described hereinabove. It will be appreciated by those skilled in the art that various modifications and alterations may be made without departing from the essential characteristics of the present disclosure. Accordingly, exemplary embodiments disclosed in the present disclosure are not to limit the technical spirit of the present disclosure but are to describe the technical spirit of the present disclosure. The scope of the technical spirit of the present disclosure is not limited by these exemplary embodiments. The scope of the present disclosure should be interpreted by the following claims, and it should be interpreted that all the technical spirits equivalent to the following claims fall within the scope of the present disclosure.

What is claimed is:

1. A transmission unit of a wireless optical charging system considering user safety, the transmission unit comprising:
    a light source having at least one of a semiconductor laser and an optical fiber laser, and configured to generate laser light;
    an output device having a diffraction grating and a beam scanner, and configured to output the laser light to an outside;
    a reflected light output device having a beam splitter, disposed between the light source and the output device, and configured to output reflected light, wherein the reflected light is a part of the output laser light that is reflected from a reception unit and returned; and
    a light generation control device having a photo detector and a laser controller, and configured to control a generation of the laser light from the light source according to a result of determining whether a user is located between the transmission unit and the reception unit based on the output reflected light,
    wherein the photo detector is configured to generate a current corresponding to the reflected light,
    wherein the laser controller is configured to:
        control the generation of the laser light from the light source according to a magnitude of the generated current,
        generate a generation signal requesting the light source to generate the laser light when the magnitude of the generated current is equal to or greater than a predetermined threshold value, and
        generate a stop signal requesting the light source to stop generating the laser light when the magnitude of the generated current is less than the threshold value, and
    wherein the light generation control device further includes:
        a current comparison device configured to compare whether the magnitude of the generated current is equal to or greater than the threshold value; and
        a light source control device configured to transmit the generation signal to the light source when the laser controller generates the generation signal while the magnitude of the generated current is equal to or greater than the threshold value, and transmit the stop signal in other cases.

2. The transmission unit of claim 1, wherein the light source includes:
    a single mode fiber having one light propagation mode;
    the optical fiber laser disposed on a path of the single mode fiber and configured to output the laser light in a wide band by adjusting its output;
    a laser pump that is linked to the light generation control device and configured to add the laser light to the single mode fiber;
    an optical wavelength combiner configured to combine the laser light added from the laser pump with the laser light from the single mode fiber; and
    a circulator disposed on the single mode fiber path and configured to output the generated laser light to the output device.

3. The transmission unit of claim 1, wherein the reflected light output device is configured to output the reflected light, which is reflected from the reception unit and returned, using the beam splitter.

4. The transmission unit of claim 1, wherein the light source includes:
    a laser generator configured to output the laser light in a wide band; and
    an optical isolator configured to output the output laser light in one direction,
    wherein the laser generator operates by being linked to the light generation control device.

5. The transmission unit of claim 1, wherein
    the diffraction grating is configured to output the generated light onto a space, and
    the beam scanner is configured to irradiate the light output onto the space to a predetermined location.

6. A transmission unit of a wireless optical charging system considering user safety, the transmission unit comprising:
    a light source configured to generate laser light, the light source including:
        a single mode fiber having one light propagation mode;
        an optical fiber laser disposed on a path of the single mode fiber and configured to output the laser light in a wide band by adjusting its output;
        a laser pump that is linked to a light generation control device and configured to add the laser light to the single mode fiber;
        an optical wavelength combiner configured to combine the laser light added from the laser pump with the laser light from the single mode fiber; and
        a circulator disposed on the single mode fiber path and configured to:
            output the generated laser light to an output device, and
            input returned light back to the single mode fiber;
    the output device having a diffraction grating and a beam scanner, and configured to output the laser light to an outside;

a reflected light output device having a beam splitter and disposed between the light source and the output device, the beam splitter configured to:

output reflected light, which is one part of the output laser light that is reflected from a reception unit and returned, and transmit the returned light, which is another part of the output laser light that is reflected from the reception unit and returned, to the circulator;

the light generation control device having a photo detector and a laser controller, and configured to control a generation of the laser light from the light source according to a result of determining whether a user is located between the transmission unit and the reception unit based on the output reflected light, wherein the photo detector is configured to generate a current corresponding to the reflected light that is output by the beam splitter, and wherein the laser controller is configured to control the generation of the laser light from the light source according to a magnitude of the generated current.

7. The transmission unit of claim 6, wherein the laser controller is further configured to:

generate a generation signal requesting the light source unit to generate the laser light when the magnitude of the generated current is equal to or greater than a predetermined threshold value, and generates a stop signal requesting the light source unit to stop generating the laser light when the magnitude of the generated current is less than the threshold value.

8. The transmission unit of claim 7, wherein the light generation control device further includes:

a current comparison unit configured to compare whether the magnitude of the generated current is equal to or greater than the threshold value; and a light source control device configured to transmit the generation signal to the light source unit when the laser controller generates the generation signal while the magnitude of the generated current is equal to or greater than the threshold value, and transmit the stop signal in other cases.

9. The transmission unit of claim 6, wherein the diffraction grating is configured to output the generated light onto a space, and the beam scanner is configured to irradiate the light output onto the space to a predetermined location.

* * * * *